Patented Feb. 17, 1953

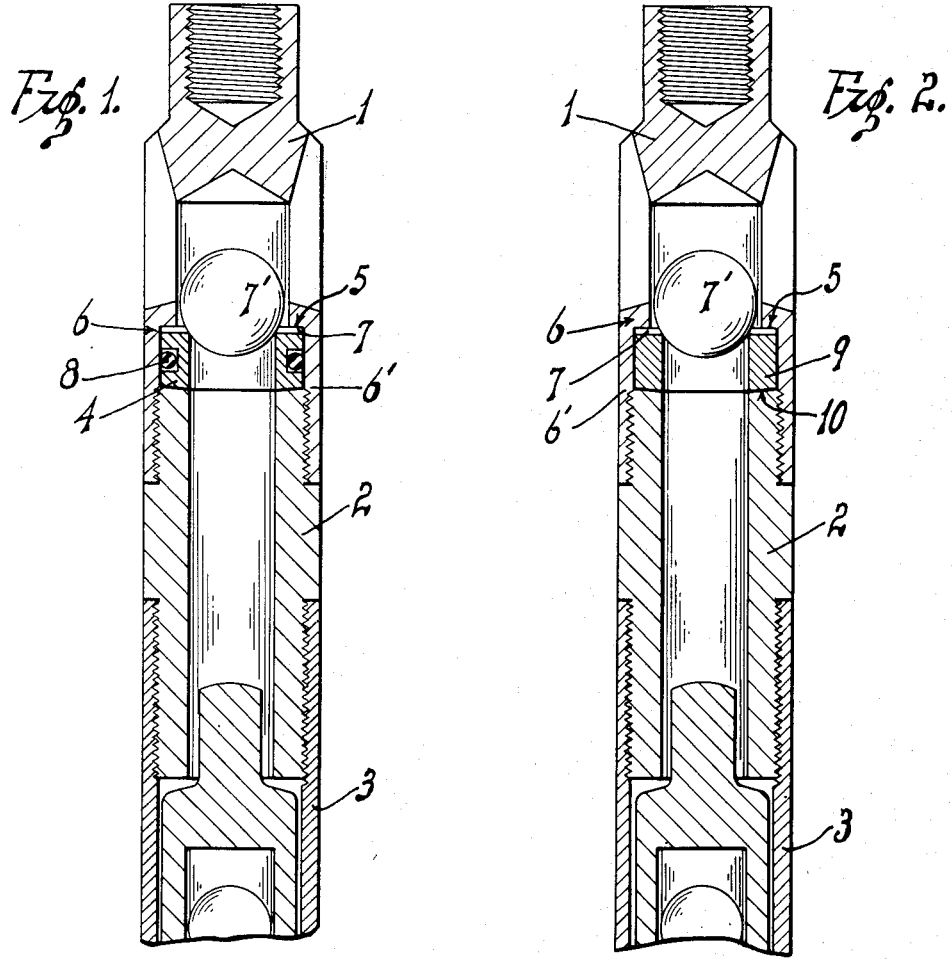

2,628,571

UNITED STATES PATENT OFFICE 2,628,571

SEAT ASSEMBLY FOR PUMP CAGES

Karl P. Neilsen, Long Beach, Calif.

Application January 2, 1948, Serial No. 147

2 Claims. (Cl. 103—225)

It is well known that in the modern deep well, and particularly oil wells, the production equipment, such as a deep well pump, is stressed to the limit of the metals now used—that is, certain parts of an oil well pump, particularly the cages, are so highly stressed due to the loads encountered in a deep well that failure frequently occurs in these cages. It is also known that when metal is highly stressed, a shock or blow will cause failure at the highly stressed area, and in a deep well such a blow occurs when the ball valve drops onto its seat.

An object of my invention is to provide a novel seat assembly for pump cages in which the seat is not clamped by the cage but is merely retained in operative position by the cage.

Another object of my invention is to provide a novel seat assembly for pump cages, in which a sealing means is provided between the seat and the cage to prevent leakage.

Still another object of my invention is to provide a novel seat assembly for pump cages, in which the seat may be provided with a ground face to prevent leakage, or a packing may be provided.

A feature of my invention is to provide a novel seat assembly for pump cages which is inexpensive to manufacture, and which can be easily machined.

Another feature of my invention is to provide a novel seat assembly of the character stated in which it is not necessary to provide a machined face between the cage and the seat.

Another feature of my invention is to provide a novel seat assembly of the character stated, which will not excessively stress the pump cages when the parts are assembled.

Other objects, advantages and features of invention may appear from the accompanying drawing, the subjoined detailed description, and the appended claims.

In the drawing:

Figure 1 is a fragmentary, longitudinal sectional view of one type of pump showing my novel seat assembly.

Figure 2 is a fragmentary, longitudinal sectional view showing a slightly modified form of seat assembly.

Referring more particularly to the drawing, while I have here shown an external traveling barrel and have disclosed my invention on a traveling valve, it is obviously practical to employ my invention on reciprocating plungers of stationary barrel pumps, and also to employ my seat assembly on a standing or stationary valve, as well as on a traveling valve.

A valve cage 1 is threaded onto a coupling 2, the coupling in turn being threaded into or onto a plunger 3. As previously stated, this plunger or barrel may be of the external or internal type. A valve seat 4 is mounted between the coupling 2 and the shoulder 5 of the cage 1. Theretofore it was necessary to clamp the seat 4 between the shoulder 5 and the top of the coupling 2. A very high torque is used to screw the cage 1 onto the coupling 2, and as a result of this high torque, an excessive stress was applied to the cage 1 at the area 6. If the cage 1 were so stressed, it is obvious that when the ball 7' strikes the seat 4, that blow would be transmitted to the cage 1, and failure at the point 6 or 6' would frequently result.

In my present construction, a space 7 is provided between the shoulder 5 and the top of the seat 4. Thus when the cage 1 is made up on the coupling 2, there is no excessive stress at the point 6. To prevent leakage around the outside of the seat 4, that is between the seat and the inside of the cage 1, I may provide an annular packing ring 8. This packing may be of the O-ring type. As shown in Figure 2, the seat 9 is arranged in the same manner as the seat 4—that is, the assembly is the same. However to prevent leakage around the seat, I may provide a tapered machined seat 10 on the bottom of the seat 9—this machined surface resting on top of the coupling 2. It is possible to combine the machined surfaces 10 with the packing 8, if desired. In my construction, the impact of the ball 7' on the seat 4 or 9 will not be transmitted to the cage 1 in the area 6, but on the contrary is transmitted downwardly into the coupling 2, which is not as highly stressed as the metal of the cage 1, due to the fact that the walls of the coupling can be made heavier than the walls of the cage 1.

The construction of pump cages is now limited by the requirement of a specific inside diameter of the pump to permit the oil to flow without restriction, and the outside diameter of the pump assembly is limited by the diameter of the bored hole. In very deep wells of from nine to twelve thousand feet, the diameter of the bored hole at the bottom is necessarily small. It is for these reasons that the parts of the pump, and particularly the cages, are excessively stressed and frequently fail. In my construction, the torque stresses are relieved from the cages and my assemblies have been operated in wells over a long period of time.

Having described my invention, I claim:

1. In a pump assembly, including a cage and a plunger on top of which the cage is threadedly mounted, a ring type valve seat mounted between the cage and the plunger, an annular shoulder formed on the inside of the said cage and adjacent the lower end thereof, said shoulder being spaced a small amount above the top surface of the seat so that the cage when in threaded engagement with the plunger does not shoulder on the top of the seat, the top surface of the plunger on which the seat rests being tapered and machined to accurately fit the machined bottom face of the seat which rests thereon.

2. In a pump assembly, including a cage and a plunger on top of which the cage is threadedly mounted, a ring type valve seat mounted between the cage and the plunger, an annular shoulder formed on the inside of the said cage and adjacent the lower end thereof, said shoulder being spaced a small amount above the top surface of the seat so that the cage when in threaded engagement with the plunger does not shoulder on the top of the seat, the top surface of the plunger on which the seat rests being tapered and machined to accurately fit the machined bottom face of the seat which rests thereon, and an annular packing mounted on the outer periphery of the seat and positioned between the exterior of the seat and the inside of the cage.

KARL P. NEILSEN.

REFERENCES CITED

The following references are of record in the file of this patent:

UNITED STATES PATENTS

| Number | Name | Date |
|---|---|---|
| 1,204,087 | Thorne | Nov. 7, 1916 |
| 1,409,450 | Humason, et al. | Mar. 14, 1922 |
| 1,626,549 | Miller | Apr. 26, 1927 |
| 1,720,705 | Waterman | July 16, 1929 |
| 1,736,486 | Carnahan | Nov. 19, 1929 |
| 1,927,055 | Winsor | Sept. 19, 1933 |
| 1,936,975 | Wasson | Nov. 28, 1933 |
| 1,975,184 | Thomson | Oct. 2, 1934 |